(12) United States Patent
Jung

(10) Patent No.: US 9,207,476 B2
(45) Date of Patent: Dec. 8, 2015

(54) LIQUID CRYSTAL DISPLAY DEVICE AND METHOD OF FABRICATING THE SAME

(71) Applicant: LG DISPLAY CO., LTD., Seoul (KR)

(72) Inventor: Yeoun-Jei Jung, Daegu (KR)

(73) Assignee: LG Display Co., Ltd., Seoul (KR)

( * ) Notice: Subject to any disclaimer, the term of this patent is extended or adjusted under 35 U.S.C. 154(b) by 29 days.

(21) Appl. No.: 14/067,778

(22) Filed: Oct. 30, 2013

(65) Prior Publication Data

US 2014/0240639 A1 Aug. 28, 2014

(30) Foreign Application Priority Data

Feb. 27, 2013 (KR) ........................ 10-2013-0021171

(51) Int. Cl.
*G02F 1/1333* (2006.01)
*G02F 1/1335* (2006.01)
*F21V 8/00* (2006.01)

(52) U.S. Cl.
CPC .... *G02F 1/133308* (2013.01); *G02F 1/133608* (2013.01); *G02F 1/133615* (2013.01); *G02B 6/009* (2013.01); *G02B 6/0023* (2013.01); *G02B 6/0088* (2013.01); *Y10T 29/49002* (2015.01)

(58) Field of Classification Search
None
See application file for complete search history.

(56) References Cited

U.S. PATENT DOCUMENTS

| | | | |
|---|---|---|---|
| 2007/0091224 A1* | 4/2007 | Liu ................................ | 349/58 |
| 2008/0094535 A1* | 4/2008 | Suh et al. ...................... | 349/58 |
| 2013/0033660 A1* | 2/2013 | Choi et al. .................... | 349/64 |

* cited by examiner

*Primary Examiner* — Dung Nguyen
*Assistant Examiner* — Shan Liu
(74) *Attorney, Agent, or Firm* — Birch, Stewart, Kolasch & Birch, LLP

(57) ABSTRACT

A liquid crystal display device includes: a liquid crystal panel; a backlight unit under the liquid crystal panel, the backlight unit including a light emitting diode (LED) assembly supplying a light and a light guide plate transmitting the light from the LED assembly to the liquid crystal panel; a main frame surrounding the backlight unit, the main frame including a flat portion for supporting the LED assembly and a guide wall for guiding the LED assembly, the guide wall including at least one concave portion; and a light shielding tape on the guide wall and the LED assembly, the light shielding tape including at least one open portion corresponding to the at least one concave portion.

9 Claims, 6 Drawing Sheets

LIQUID CRYSTAL DISPLAY DEVICE AND METHOD OF FABRICATING THE SAME

CROSS REFERENCE TO RELATED APPLICATIONS

The present application claims the benefit of priority of Korean Patent Application No. 10-2013-0021171 filed in the Republic of Korea on Feb. 27, 2013, which is hereby incorporated by reference in its entirety.

BACKGROUND OF THE INVENTION

1. Field of the Disclosure

The present disclosure relates to a liquid crystal display device. The present disclosure also relates to a liquid crystal display device where deterioration such as a light leakage or a non-uniformity in luminance is prevented due to an open portion of a light shielding tape and a concave portion of a main frame and a method of fabricating the liquid crystal display device.

2. Discussion of the Related Art

As the information age progresses, display devices processing and displaying a large amount of information have been rapidly developed. Specifically, various flat panel displays (FPDs) such as a liquid crystal display (LCD) device, a plasma display panel (PDP) device, an organic light emitting diode (OLED) display devices and a field emission display (FED) device having a superior performance with a thin profile, a light weight, and a low power consumption have substituted for a cathode ray tube (CRT).

Among various FPDs, the LCD device has various features such as a high contrast ratio and superiority in displaying a moving image. The LCD device has been widely used, such as computer monitors or televisions.

Since the LCD device is a non-emissive type display device, an additional light source is required. Accordingly, a backlight unit including a light source is disposed under the liquid crystal panel and a light from the backlight unit is supplied to the liquid crystal panel. For example, one of a cold cathode fluorescent lamp (CCFL), an external electrode fluorescent lamp (EEFL) and a light emitting diode (LED) may be used as the light source. Among various light sources, the LED has been widely used for its various features such as a small size, a low power consumption and a high reliability.

Since the light from the backlight unit is partially transmitted to a region other than a display region of the liquid crystal panel, a light shielding tape is required to prevent the light leakage.

FIG. 1 is a cross-sectional view showing a liquid crystal display device including a light shielding tape according to the related art, and FIGS. 2A and 2B are cross-sectional views showing deterioration in a liquid crystal display device according to the related art.

In FIG. 1, a liquid crystal display (LCD) device 10 includes a liquid crystal panel 11, a backlight unit 20, a main frame 30 and a light shielding tape 61. The liquid crystal panel 11 for displaying an image includes first and second substrates 12 and 14 facing and spaced apart from each other and a liquid crystal layer (not shown) between the first and second substrates 12 and 14. First and second polarizing plates (not shown) are formed on outer surfaces of the first and second substrates 12 and 14, respectively.

The backlight unit 20 for supplying a light is disposed under the liquid crystal panel 11. The backlight unit 20 includes a light source along at least one side of the main frame 30, a reflecting plate 25 of a white color or a silver color, a light guide plate 23 on the reflecting plate 25 and a plurality of optical sheets 21 on the light guide plate 23.

For example, the light source may include a light emitting diode (LED) assembly 29 and the LED assembly 29 may include a plurality of LEDs 29a spaced apart from each other and a flexible printed circuit board (FPCB) 29b where the plurality of LEDs 29a are mounted. The LED assembly 29 is fixed by a method such as adhesion so that the light from the plurality of LEDs 29a can be emitted toward an incident surface of the light guide plate 23.

Since the LED assembly 29 is disposed at a side of the light guide plate 23 and the reflecting plate 25 is disposed under the light guide plate 23, the light from the plurality of LEDs 29a passes through a lower surface of the light guide plate 23 and is reflected on the reflecting plate 25 toward the liquid crystal panel 11. As a result, a luminance of the light supplied to the liquid crystal panel 11 increases.

The light guide plate 23 supplies a plane light to the liquid crystal panel 11 using the light from the plurality of LEDs 29a.

The main frame 30 having a rectangular ring shape includes a flat portion 32 for supporting the LED assembly 29 and a guide wall 33 for guiding the LED assembly 29. The flat portion 32 is disposed inside the guide wall 33 and the guide wall 33 vertically protrudes from an edge portion of the main frame 30. The LED assembly 29 is disposed on the flat portion 32.

When the LCD device 10 is shown in a front view, the light shielding tape 61 is disposed to overlap an edge portion of the liquid crystal panel 11 and the main frame 30. In addition, the light shielding tape 61 is attached to a lower surface of the edge portion of the liquid crystal panel 11 and a top surface of the guide wall 33 of the main frame 30 so that the liquid crystal panel 11 and the backlight unit 20 can be modularized with the main frame 30 and the light shielding tape 61.

The main frame 30 wraps side surfaces of the backlight unit 20 to prevent disassembly of the backlight unit 20, and the light shielding tape 61 attaches and fixes the liquid crystal panel 11 to the main frame 30 to prevent disassembly of the liquid crystal panel 11. In addition, the light shielding tape 61 prevent a light leakage toward a region other than a display region of the liquid crystal panel 11.

Recently, as a demand for a thin profile of the LCD device 10 increases, a height of the guide wall 33 of the main frame 30 decreases. Since most of the modularization process for attaching the main frame 30 and the light shielding tape 61 is performed manually, it is hard to dispose the LED assembly 29 on the flat portion 32 of the main frame 30 accurately when the guide wall 33 has a relatively small height. Accordingly, when the LCD device 10 is modularized, decrease of the height of the guide wall 33 may cause deterioration such that the LED assembly 29 is disposed on the guide wall 33.

In FIG. 2A, when the LED assembly 29 is slantly disposed on the guide wall 33 during the modularization process, a light B1 emitted from the plurality of LEDs 29a of the LED assembly 29 is distorted to cause a light leakage. In FIG. 2B, when the LED assembly 29 is abnormally disposed on the guide wall 33 during the modularization process, a part B2 of a light emitted from the plurality of LEDs 29a directly enters the plurality of optical sheets 21 to cause non-uniformity in luminance of the plane light through the light guide plate 23.

In addition, as a width of the guide wall 33 decreases in the LCD device 10 of a thin profile, a contact area between the light shielding tape 61 and the guide wall 33 decreases and an adhesive force between the light shielding tape 61 and the guide wall 33 decreases. As a result, the light shielding tape 61 is detached from the main frame 30 and the detachment of the light shielding tape 61 causes a light leakage.

The LCD device 10 may be formed to have a relatively greater adhesion force by a relatively larger contact area between the light shielding tape 61 and the guide wall 33 or a relatively thicker adhesive layer of the light shielding tape 61. However, the larger contact area is limited due to design rule and the thicker adhesive layer is limited due to a thin light shielding tape 61.

In addition, even when the LED assembly 29 is disposed on the guide wall 33, the abnormal disposition is seldom detected with the naked eye during the modularization process for the LCD device 10 of a thin profile. Since the abnormal disposition of the LED assembly 29 and the guide wall 33 is detected after the modularization process is completed, fabrication process for rework is complicated and fabrication time and production cost of the LCD device 10 increase.

SUMMARY OF THE INVENTION

Accordingly, embodiments of the present invention are directed to a liquid crystal display device that substantially obviates one or more of the problems due to limitations and disadvantages of the related art.

An object of the present disclosure is to provide a liquid crystal display device where deterioration is detected with the naked eye during the modularization process and a method of fabricating the liquid crystal display device.

Another object of the present disclosure is to provide a liquid crystal display device where deterioration such as a light leakage or a non-uniformity in luminance is prevented and a method of fabricating the liquid crystal display device.

Additional features and advantages of the invention will be set forth in the description which follows, and in part will be apparent from the description, or may be learned by practice of the invention. The objectives and other advantages of the invention will be realized and attained by the structure particularly pointed out in the written description and claims hereof as well as the appended drawings.

To achieve these and other advantages, as embodied and broadly described herein, there is provided a liquid crystal display device including: a liquid crystal panel; a backlight unit under the liquid crystal panel, the backlight unit including a light emitting diode (LED) assembly supplying a light and a light guide plate transmitting the light from the LED assembly to the liquid crystal panel; a main frame surrounding the backlight unit, the main frame including a flat portion for supporting the LED assembly and a guide wall for guiding the LED assembly, the guide wall including at least one concave portion; and a light shielding tape on the guide wall and the LED assembly, the light shielding tape including at least one open portion corresponding to the at least one concave portion.

In another aspect, there is provided a method of fabricating a liquid crystal display device including: disposing a backlight unit on a main frame, the backlight unit including a light emitting diode (LED) assembly supplying a light and a light guide plate receiving the light, the main frame including a flat portion for supporting the LED assembly and a guide wall for guiding the LED assembly, the guide wall including at least one concave portion; attaching a light shielding tape to the guide wall and the LED assembly, the light shielding tape including at least one open portion corresponding to the at least one concave portion; and attaching a liquid crystal panel to the main frame through the light shielding tape, the liquid crystal panel disposed over the backlight unit.

It is to be understood that both the foregoing general description and the following detailed description are exemplary and explanatory and are intended to provide further explanation of the invention as claimed.

BRIEF DESCRIPTION OF THE DRAWINGS

The accompanying drawings, which are included to provide a further understanding of the invention and are incorporated in and constitute a part of this specification, illustrate embodiments of the invention and together with the description serve to explain the principles of the invention. In the drawings.

DETAILED DESCRIPTION OF THE PREFERRED EMBODIMENTS

Reference will now be made in detail to the preferred embodiments, examples of which are illustrated in the accompanying drawings.

Figure 1:
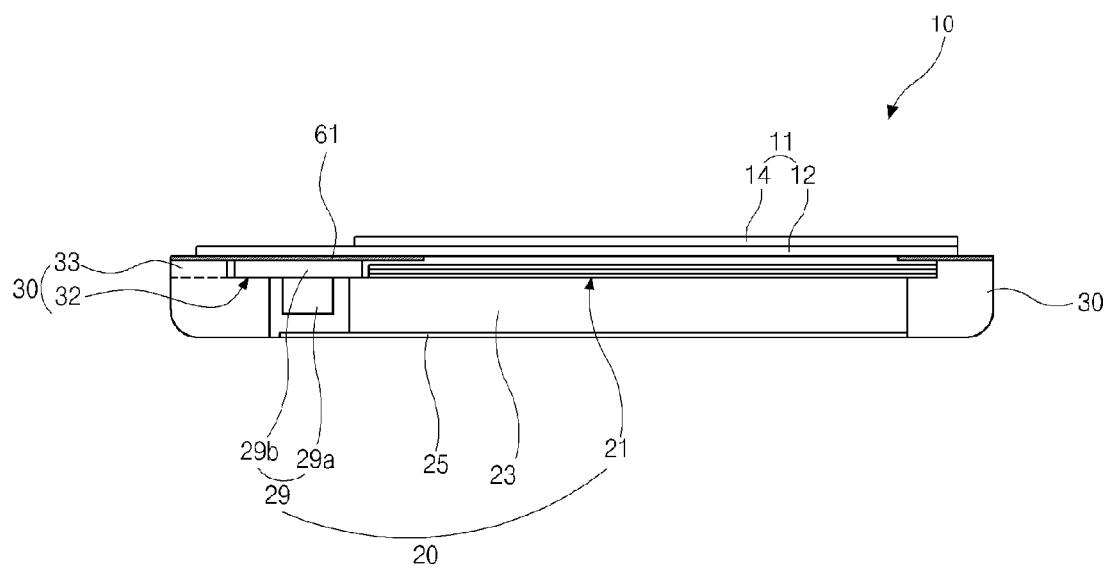
FIG. 1 is a cross-sectional view showing a liquid crystal display device including a light shielding tape according to the related art.
Figure 2A:
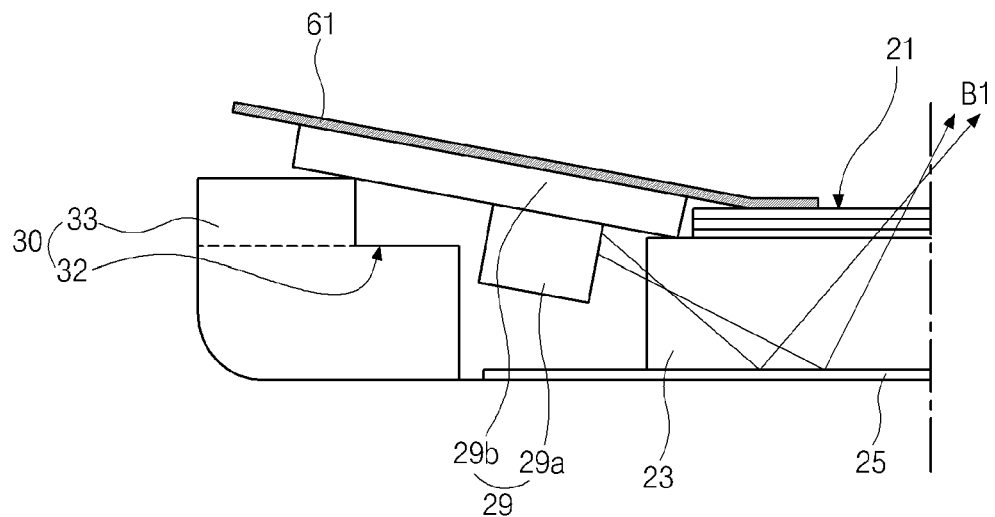
FIGS. 2A and 2B are cross-sectional views showing deterioration in a liquid crystal display device according to the related art.
Figure 2B:
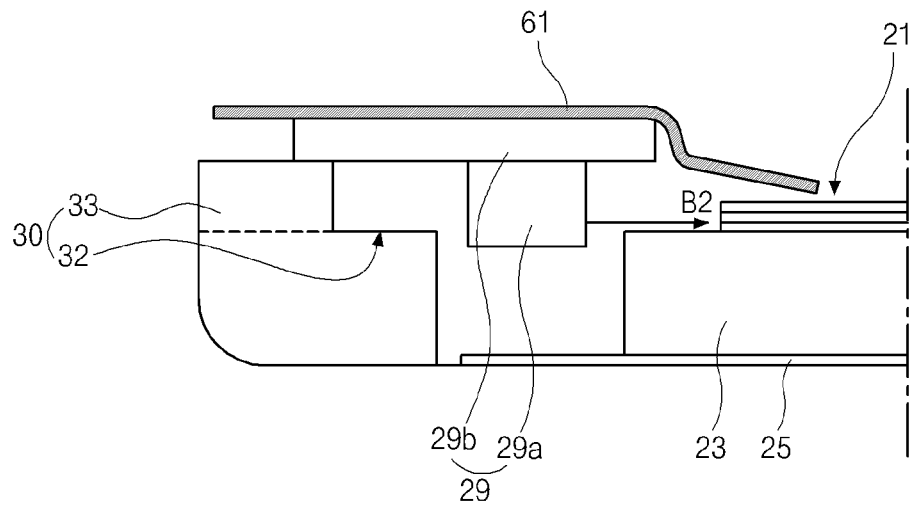
Figure 3:
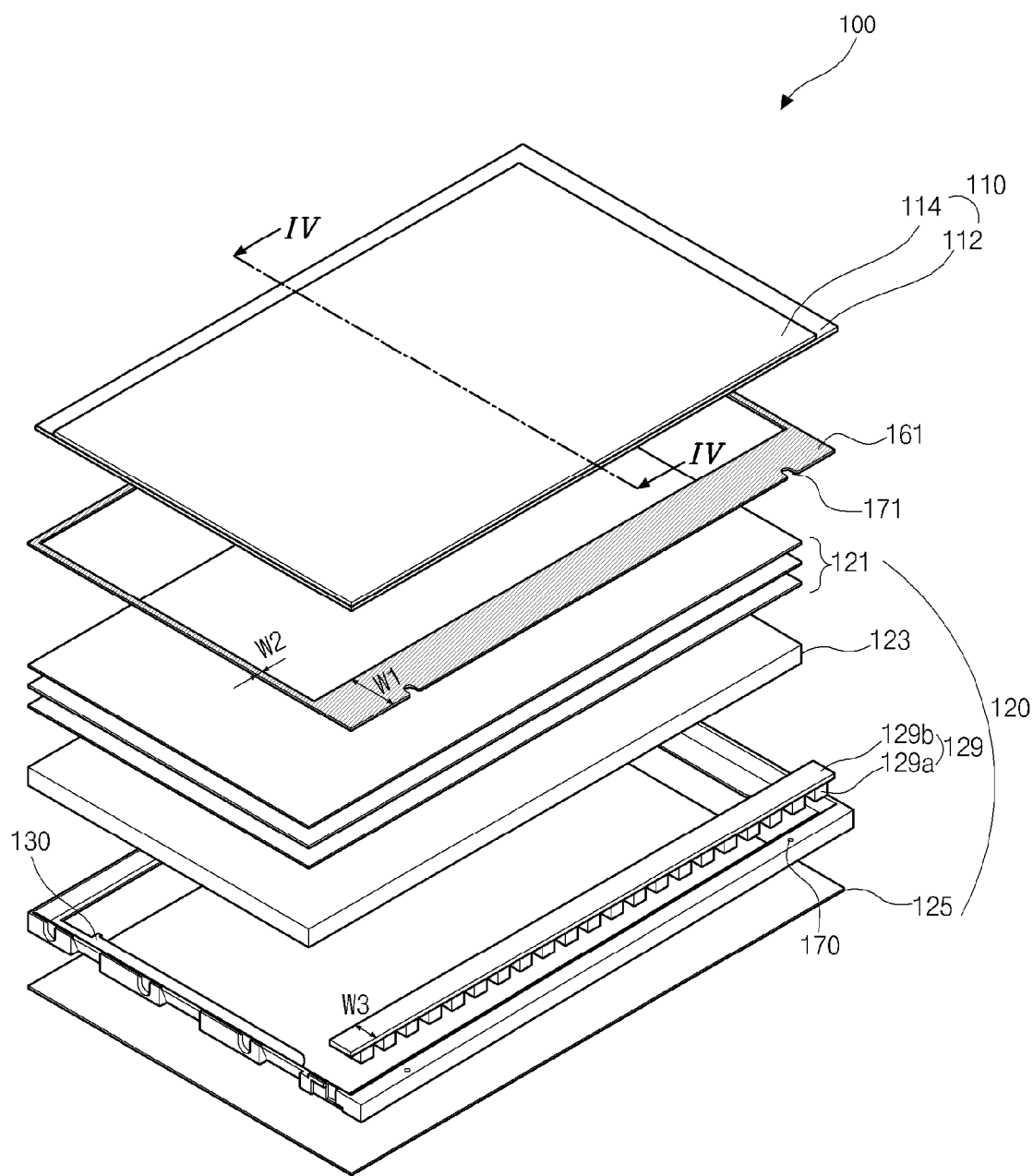
FIG. 3 is an exploded perspective view showing a liquid crystal display device according to a first embodiment of the present invention.
Figure 4:
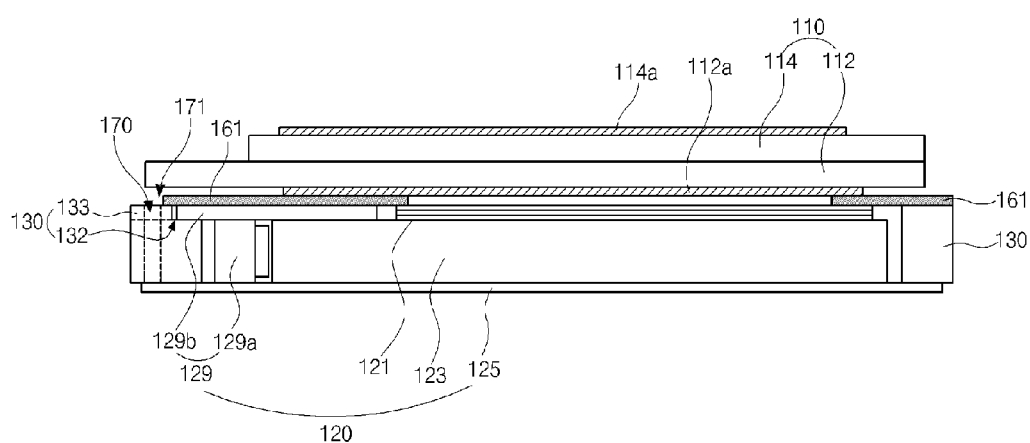
FIG. 4 is a cross-sectional view taken along a line IV-IV of FIG. 3.

FIG. 3 is an exploded perspective view showing a liquid crystal display device according to a first embodiment of the present invention, and FIG. 4 is a cross-sectional view taken along a line IV-IV of FIG. 3. Although a liquid crystal display device 100 is modularized by a main frame 130 without a bottom frame and a top frame for a thin profile in FIGS. 3 and 4, a liquid crystal display device may be modularized by a bottom frame, a main frame and a top frame in another embodiment.

In FIG. 3, a liquid crystal display (LCD) device 100 includes a liquid crystal panel 110, a backlight unit 120, a main frame 130 and a light shielding tape 161. The liquid crystal panel 110 for displaying an image includes first and second substrates 112 and 114 and a liquid crystal layer (not shown) between the first and second substrates 112 and 114.

Although not shown, when the LCD device 100 has an active matrix type, a gate line and a data line are formed on an inner surface of the first substrate 112, which is referred to as an array substrate or a lower substrate. The gate line and the data line cross to define a pixel region, and a thin film transistor (TFT) is connected to the gate line and the data line. A pixel electrode connected to the TFT is formed in the pixel region.

Although not shown, a black matrix corresponding to the gate line, the data line and the TFT is formed on an inner surface of the second substrate 114, which is referred to as a color filter substrate or an upper substrate. A color filter layer including red, green and blue color filters is formed on the black matrix and a common electrode is formed on the color filter layer.

In addition, first and second polarizing plates 112a and 114a selectively transmitting a polarized light are formed on outer surfaces of the first and second substrates 112 and 114, respectively.

Although not shown, a printed circuit board (PCB) is connected to the liquid crystal panel 110 along at least one side through a connection means such as a flexible printed circuit (FPC) or a tape carrier package (TCP). The PCB may receive various signals such as an image signal, a horizontal synchronization signal, a vertical synchronization signal, a data enable signal and a clock signal from an external circuit such as a graphic card or a television system.

In the liquid crystal panel 110, when the TFT connected to the gate line is selectively turned on by a gate signal outputted from a gate driving circuit, a data signal outputted from a data driving circuit is applied to the pixel electrode through the data line. As a result, liquid crystal molecules are re-aligned by an electric field generated between the pixel electrode and the common electrode and transmittance of the liquid crystal layer is changed to display an image.

The backlight unit 120 for supplying a light is disposed under the liquid crystal panel 110. The backlight unit 120 includes a light source along at least one side of the main frame 130, a reflecting plate 125 of a white color or a silver color, a light guide plate 123 on the reflecting plate 125 and a plurality of optical sheets 121 on the light guide plate 123. A light emitted from the light source is indirectly supplied to the liquid crystal panel 110 through refraction and total reflection in the light guide plate 123.

A light emitting diode (LED) assembly 129 may be used as the light source. The LED assembly 129 may include a plurality of LEDs 129a spaced apart from each other and a flexible printed circuit board (FPCB) 129b where the plurality of LEDs 129a are mounted. Since the LED assembly 129 is disposed to face into an incident surface of the light guide plate 123, the light from the plurality of LEDs 129a enters the incident surface of the light guide plate 123.

Since the reflecting plate 125 is disposed under the light guide plate 123, the light from the plurality of LEDs 129a passes through a lower surface of the light guide plate 123 and is reflected toward the liquid crystal panel 110 by the reflecting plate 125. As a result, a luminance of the light supplied to the liquid crystal panel 110 increases.

The light emitted from the light from the plurality of LEDs 129a is diffused by total reflection in the light guide plate 123 so that a uniform plane light can be supplied to the liquid crystal panel 110.

For the purpose of supplying a uniform plane light, a pattern having a predetermined shape may be formed on the lower surface of the light guide plate 123. The pattern may have one of an elliptical shape, a polygonal shape and a hologram pattern and may be formed through one of a printing method and a molding method.

The plurality of optical sheets 121 may diffuse or collimate the light passing through the light guide plate 123 to supply a more uniform plate light to the liquid crystal panel 110. The plurality of optical sheets 121 may include a diffusion sheet, at least one prism sheet and a protection sheet.

The main frame 130 having a rectangular ring shape includes a flat portion 132 for supporting the LED assembly 129 and a guide wall 133 for guiding the LED assembly 129. The flat portion 132 is disposed inside the guide wall 133 and the guide wall 133 vertically protrudes from an edge portion of the main frame 130. The LED assembly 129 is disposed on the flat portion 132. The main frame 130 may be referred to as a guide panel, a main support or a mold frame.

In addition, at least one concave portion 170 is formed on a top surface of the guide wall 133 of the main frame 130. For example, the at least one concave portion 170 may have a through hole shape.

The LED assembly 129 may have a side view type such that a light emitted from the plurality of LEDs 129a is parallel to the FPCB 129b. Accordingly, the FPCB 129b is attached and fixed to the flat portion 132 and the plurality of LEDs 129a are disposed to face into the incident surface of the light guide plate 123. The main frame 130 may wrap side surfaces of the light guide plate 123 and an edge portion of the reflecting plate 125 may be attached to the main frame 130 with an adhesive material.

When the LCD device 100 is shown in a front view, the light shielding tape 161 is disposed to overlap an edge portion of the liquid crystal panel 110 and the main frame 130. In addition, the light shielding tape 161 is attached to a lower surface of the edge portion of the liquid crystal panel 110 and a top surface of the guide wall 133 of the main frame 130 so that the liquid crystal panel 110 and the backlight unit 120 can be modularized by the main frame 130 and the light shielding tape 161.

The main frame 130 may wrap side surfaces of the backlight unit 120 to prevent disassembly of the backlight unit 120, and the light shielding tape 161 may attach and fix the liquid crystal panel 110 to the main frame 130 to prevent disassembly of the liquid crystal panel 110.

In addition, the light shielding tape 161 prevent a light leakage toward a region other than a display region of the liquid crystal panel 110. The light shielding tape 161 may have a rectangular ring shape having four side portions covering four edge portions of an upper surface of the backlight unit 120 and an open portion exposing a central portion of the upper surface of the backlight unit 120.

The first side portion of the light shielding tape 161 corresponding to the LED assembly 129 may have a first width w1, and each of the second to fourth side portions of the light shielding tape 161 may have a second width w2 smaller than the first width w1. Further, the first side portion of the light shielding tape 161 may be formed to completely cover the FPCB 129b. As a result, when the FPCB 129b has a third width w3, the first width w1 may be greater than the third width w3.

In addition, the first side portion of the light shielding tape 161 may be formed to overlap the guide wall 133 and the plurality of optical sheets 121. For example, the first side portion of the light shielding tape 161 may have the first width w1 corresponding to a length from a point over the guide wall 133 to a point over an edge portion of the plurality of optical sheets 121. Accordingly, the light leakage toward a region other than a display region of the liquid crystal panel 110 is prevented by the light shielding tape 161. Moreover, movement of the plurality of optical sheets 121 may be prevented by the light shielding tape 161 covering the edge portion of the plurality of optical sheets 121.

Further, the light shielding tape 161 may have at least one open portion 171 exposing the at least one concave portion 170 of the main frame 130.

The light shielding tape 161 may include a double-sided adhesive tape of a light weight and a thin profile. Accordingly, the light shielding tape 161 may be applied to a small-sized LCD device having a light weight and a thin profile for a portable phone, a digital multimedia broadcasting (DMB) terminal, a personal digital assistants (PDA) and a digital camera. In addition, the light shielding tape 161 may be applied to a large-sized FPD such as an LCD device, a PDP device, an OLED display device and an FED device for a television and a desktop computer.

In FIG. 4, the LED assembly 129 is disposed on the flat portion 132 of the main frame 130 and the light shielding tape 161 is attached to the LED assembly 129 and the guide wall 133 of the main frame 130. When the LED assembly 129 is not accurately disposed on the flat portion 132, the light shielding tape 161 is not accurately attached to the LED assembly 129 and the guide wall 133. For example, the light shielding tape 161 may not cover an area from the guide wall 133 of the main frame 130 to the edge portion of the plurality of optical sheets 121.

For the purpose of inspecting whether the light shielding tape 161 is accurately disposed and whether the LED assembly 129 is accurately disposed, the main frame 130 has the at least one concave portion 170 on the top surface of the guide wall 133, and the light shielding tape 161 has the at least one open portion 171 corresponding to the at least one concave portion 170. As a result, when the light shielding tape 161 is attached to the main frame 130 and the LED assembly 129, the at least one open portion 171 of the light shielding tape 161 exposes the at least one concave portion 170 of the main frame 130.

The method of inspecting alignment state of the LED assembly 129 and the main frame 130 and alignment state of the main frame 130 and the light shielding tape 161 will be illustrated with reference to drawings hereinafter.

Figure 5:
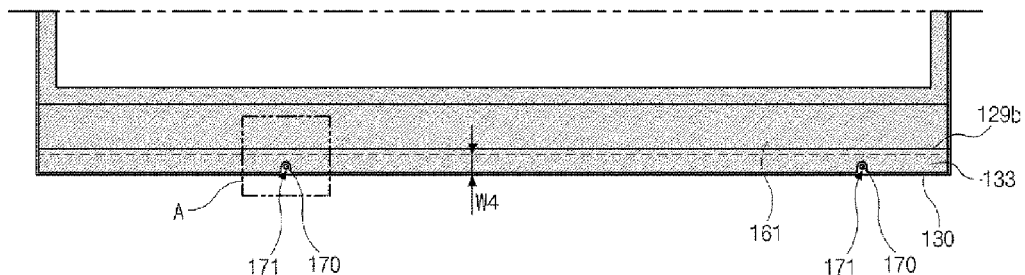
FIG. 5 is a plane view showing an edge portion of a liquid crystal display device according to a first embodiment of the present invention.
Figure 6:
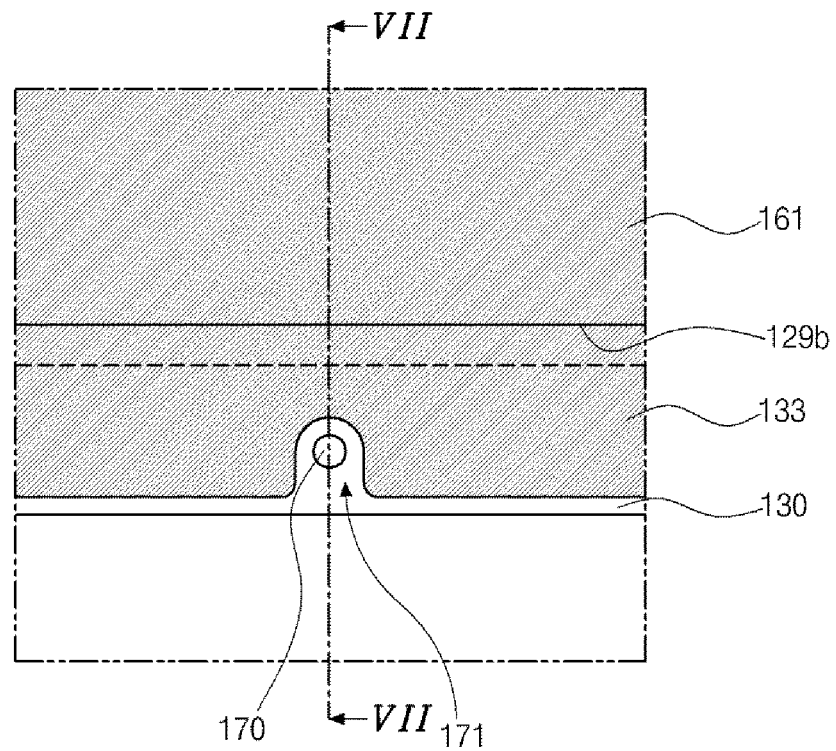
FIG. 6 is a magnified view of a region A of FIG. 5.
Figure 7:
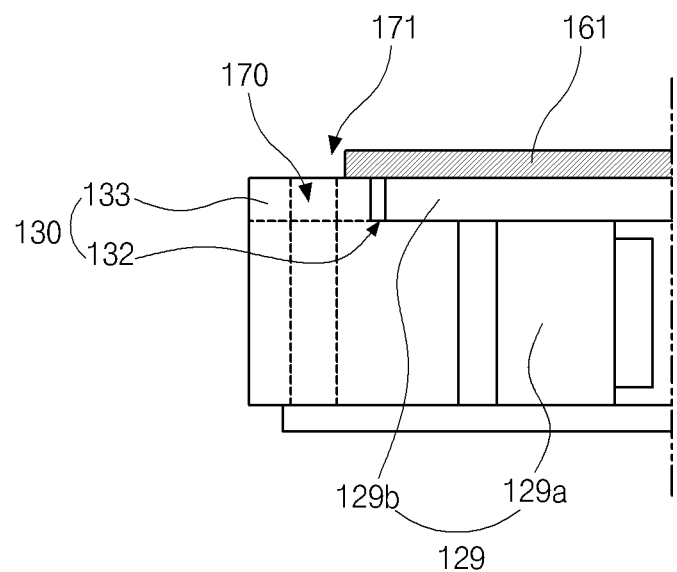
FIG. 7 is a cross-sectional view taken along a line VII-VII of FIG. 6.

FIG. 5 is a plane view showing an edge portion of a liquid crystal display device according to a first embodiment of the present invention, FIG. 6 is a magnified view of a region A of FIG. 5, and FIG. 7 is a cross-sectional view taken along a line VII-VII of FIG. 6.

In FIGS. 5 to 7, the at least one concave portion 170 is formed on the top surface of the guide wall 133 of the main frame 130, and the FPCB 129b of the LED assembly 129 is disposed on the flat portion 133 of the main frame 130 such that the FPCB 129b of the LED assembly 129 is aligned to a side surface of the guide wall 133 of the main frame 130. In addition, the light shielding tape 161 having the at least one open portion 171 is attached to the guide wall 133 of the main frame 130 and the FPCB 129b of the LED assembly 129 such that the at least one open portion 171 is aligned to the at least one concave portion 170. After the light shielding tape 161 is attached and before the reflecting plate 125 and the liquid crystal panel 110 are attached, the alignment state of the LED assembly 129 and the main frame 130 and the alignment state of the main frame 130 and the light shielding tape 161 may be inspected with the naked eye by illuminating the at least one concave portion 170 and the at least one open portion 171. The at least one concave portion 170 may have a width smaller than a fourth width w4 of the guide wall 133.

When the FPCB 129b is disposed on the flat portion 133 and the light shielding tape 161 is attached to the guide wall 133 and the FPCB 129b in a normal alignment state, the shape of the at least one concave portion 170 is clearly inspected. When the FPCB 129b is disposed on the guide wall 133 or the light shielding tape 161 is distortedly attached to the guide wall 133 and the FPCB 129b in an abnormal alignment state, the shape of the at least one concave portion 170 is not clearly inspected because the at least one concave portion 170 is partially hidden by the FPCB 129b or the boundary of the at least one open portion 171.

Accordingly, deterioration such as an alignment error is detected by inspecting the at least one concave portion 170 and the at least one open portion 171 with the naked eye after the light shielding tape 161 is attached to the main frame 130 and before the reflecting plate 125 and the liquid crystal panel 110 are attached to the main frame 130. When deterioration is detected, the light shielding tape 161 is detached and the LED assembly 129 is re-disposed on the flat portion 132 of the main frame 130. As a result, fabrication process for rework is simplified and fabrication time and production cost are reduced.

The number and the position of the at least one concave portion 170 and the at least one open portion 171 may be variously changed in another embodiment.

Although the at least one open portion 171 of the light shielding tape 161 has a semicircular shape such that the at least one open portions 171 is communicated with the edge of the light shielding tape 161 in the first embodiment, the open portion may have a circular shape such that the open portion is separated from the edge of the light shielding tape in another embodiment. Further, the at least one open portion 171 may have various shapes in a plan view.

Although the at least one concave portion 170 has a circular shape in a plan view in the first embodiment, the concave portion may have various shapes in a plan view in another embodiment.

Figure 8:
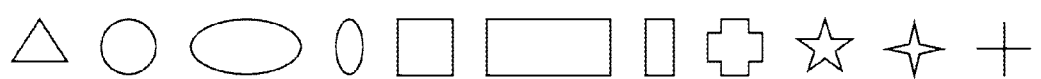
FIG. 8 is a view showing a planar shape of a concave portion of a main frame of a liquid crystal display device according to other embodiments of the present invention.

FIG. 8 is a view showing a planar shape of a concave portion of a main frame of a liquid crystal display device according to other embodiments of the present invention.

In FIG. 8, a concave portion of a main frame may have one of a triangular shape, a circular shape, an elliptical shape, a square shape, a rectangular shape, a polygonal shape such as a star and a cross shape in a plan view.

In addition, although the at least one concave portion 170 has a through hole shape such that the at least one concave portion 170 is formed through the whole portions of the main frame 130, the concave portion may have a groove shape in another embodiment. Alternatively, a convex portion instead of the concave portion 170 may be formed on the top surface of the guide wall 133 of the main frame 130 for inspection in another embodiment.

Figure 9:
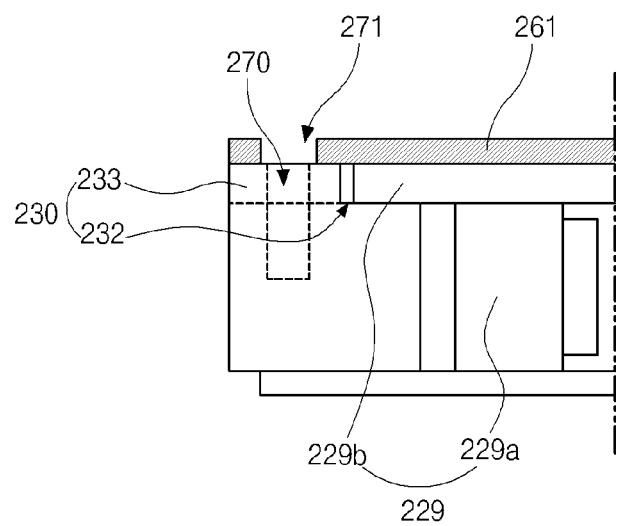
FIG. 9 is a cross-sectional view showing an edge portion of a liquid crystal display device according to a second embodiment of the present invention.

FIG. 9 is a cross-sectional view showing an edge portion of a liquid crystal display device according to a second embodiment of the present invention.

In FIG. 9, an LED assembly 229 including a plurality of LEDs 229a and an FPCB 229b is disposed on a main frame 230 including a flat portion 232 and a guide wall 233. For example, the FPCB 229b may be disposed on the flat portion 232, and an edge portion of the FPCB 229b may be aligned to an edge portion of the guide wall 233. The guide wall 233 has at least one concave portion 270.

In addition, a light shielding tape 261 having at least one open portion 271 is formed on the main frame 230 and the LED assembly 229. For example, the light shielding tape 261 may be attached to the guide wall 233 and the FPCB 229b, and the at least one open portion 271 may expose the at least one concave portion 270.

The at least one concave portion 270 may have a groove shape such that the at least one concave portion 270 is formed in an upper portion of the main frame 230. Further, the at least one open portion 271 may have a circular shape such that the at least one open portion 271 is not communicated with and is separated from the edge of the light shielding tape 261. The at least one open portion 271 is surrounded by the light shielding tape 261.

Consequently, deterioration in modularization process is detected by inspecting the concave portion of the guide wall of the main frame and the open portion of the light shielding tape with the naked eye before the reflecting plate and the liquid crystal panel are attached. As a result, fabrication process for rework is simplified and fabrication time and production cost are reduced. In addition, since the light shielding tape of a double-sided adhesive tape is formed between the main frame and the liquid crystal panel, a light leakage or a non-uniformity in luminance is prevented in an LCD device of a thin profile.

It will be apparent to those skilled in the art that various modifications and variations can be made in a liquid crystal display device and a method of fabricating the liquid crystal display device of the present disclosure without departing from the sprit or scope of the invention. Thus, it is intended that the present invention covers the modifications and variations of this invention provided they come within the scope of the appended claims and their equivalents.

What is claimed is:

1. A liquid crystal display device, comprising:
a liquid crystal panel;
a backlight unit under the liquid crystal panel, the backlight unit including a light emitting diode (LED) assembly supplying a light and a light guide plate transmitting the light from the LED assembly to the liquid crystal panel;
a main frame surrounding the backlight unit, the main frame including a flat portion for supporting the LED assembly and a guide wall for guiding the LED assembly, the guide wall including at least one concave portion; and
a light shielding tape on the guide wall and the LED assembly, the light shielding tape including at least one open portion corresponding to the at least one concave portion,
wherein the at least one concave portion is exposed through the at least one open portion.

2. The liquid crystal display device according to claim 1, wherein the at least one concave portion has one of a through hole shape and a groove shape.

3. The liquid crystal display device according to claim 1, wherein the at least one concave portion has one of a circular shape, a polygonal shape and a cross shape in a plan view.

4. The liquid crystal display device according to claim 1, wherein the at least one open portion has one of a semicircular shape and a circular shape.

5. The liquid crystal display device according to claim 1, wherein a width of the at least one concave portion is smaller than a width of the guide wall.

6. The liquid crystal display device according to claim 1, wherein the LED assembly includes a plurality of light emitting diodes (LEDs) and a flexible printed circuit board (FPCB) where the plurality of LEDs are mounted, and wherein the LED assembly has a side view type such that the light emitted from the plurality of LEDs is parallel to the FPCB.

7. The liquid crystal display device according to claim 6, wherein the FPCB is attached and fixed to the flat portion and the plurality of LEDs are disposed to face into an incident surface of the light guide plate.

8. The liquid crystal display device according to claim 1, wherein the backlight unit further includes a reflecting plate under the light guide plate and a plurality of optical sheets over the light guide plate.

9. The liquid crystal display device according to claim 7, wherein the light shielding tape covers the guide wall, the LED assembly and an edge portion of the plurality of optical sheets.

* * * * *